(12) United States Patent  (10) Patent No.: US 6,629,818 B2
Svoboda                    (45) Date of Patent:   Oct. 7, 2003

(54) IMPELLER FOR USE WITH PORTABLE BLOWER/VACUUMS

(75) Inventor: Steven J. Svoboda, Bloomington, MN (US)

(73) Assignee: The Toro Company, Bloomington, MN (US)

( * ) Notice: Subject to any disclaimer, the term of this patent is extended or adjusted under 35 U.S.C. 154(b) by 210 days.

(21) Appl. No.: 09/822,101

(22) Filed: Mar. 30, 2001

(65) Prior Publication Data

US 2002/0108211 A1 Aug. 15, 2002

Related U.S. Application Data

(63) Continuation-in-part of application No. 09/779,966, filed on Feb. 9, 2001, now Pat. No. 6,442,790.

(51) Int. Cl.⁷ ............................................. F04D 29/30
(52) U.S. Cl. .................... 415/121.1; 415/204; 415/206; 416/175; 416/203; 416/185; 416/188; 416/228; 416/238; 416/236 R; 15/339; 15/405; 241/55; 29/889.4
(58) Field of Search ............................... 415/121.1, 204, 415/206; 416/175, 203, 183, 185, 188, 223 B, 228, 238, 235, 236 R; 15/339, 405; 241/55; 29/889.4

(56) References Cited

U.S. PATENT DOCUMENTS

| 2,340,457 A | | 2/1944 | Dion |
| 2,847,156 A | * | 8/1958 | Bleier ........................ 416/185 |
| 3,608,838 A | | 9/1971 | Lundin et al. |
| 3,712,353 A | | 1/1973 | Ferry |
| 3,917,176 A | | 11/1975 | Carlsmith |
| 3,968,938 A | | 7/1976 | Ruhl et al. |
| 3,986,676 A | | 10/1976 | Husmann |
| 4,074,869 A | | 2/1978 | Johnson |
| 4,076,460 A | | 2/1978 | Roof |
| 4,117,983 A | | 10/1978 | Browning |
| 4,121,405 A | | 10/1978 | Wolf |
| 4,288,886 A | | 9/1981 | Siegler |
| 4,325,163 A | | 4/1982 | Mattson et al. |
| 4,430,214 A | | 2/1984 | Baker |
| 4,441,857 A | * | 4/1984 | Jackson et al. ......... 416/223 B |
| 4,527,380 A | | 7/1985 | Fushiya et al. |
| 4,644,606 A | | 2/1987 | Luerken et al. |
| 4,694,528 A | | 9/1987 | Comer et al. |
| 4,746,274 A | | 5/1988 | Kiyooka et al. |

(List continued on next page.)

FOREIGN PATENT DOCUMENTS

| DE | 1653802 | | 3/1977 | |
| DE | 30 05 701 A1 | | 8/1981 | |
| GB | 2046360 A | * | 11/1980 | ................. 416/203 |
| GB | 2098273 | | 11/1982 | |
| JP | 52-41904 | | 3/1977 | |
| SU | 1073495 A | * | 2/1984 | ................. 416/183 |

*Primary Examiner*—Christopher Verdier
(74) *Attorney, Agent, or Firm*—Fulbright & Jaworski L.L.P.

(57) ABSTRACT

An impeller for generating an air flow, for use in a device such as a blower/vacuum, the impeller having a hub structure for mounting the impeller on a rotatable shaft of the blower/vac and a plurality of air-flow generating vanes coupled to the hub structure in a non-uniform manner wherein the spacing between adjacent vanes is irregular. An impeller having non-uniform spacing between adjacent vanes is provided. Additional features of the impeller may include a plurality of debris engaging structures or serrations for facilitating a finer mulch of air-entrained debris.

23 Claims, 13 Drawing Sheets

U.S. PATENT DOCUMENTS

| | | |
|---|---|---|
| RE33,050 E | 9/1989 | Tuggle et al. |
| 4,904,159 A | 2/1990 | Wickoren |
| 5,026,251 A * | 6/1991 | Kinoshita et al. ............ 415/206 |
| 5,085,375 A | 2/1992 | Haworth |
| 5,240,189 A | 8/1993 | Majkrzak et al. |
| 5,245,726 A | 9/1993 | Rote et al. |
| 5,294,063 A | 3/1994 | Bote |
| 5,358,189 A | 10/1994 | Vandermolen |
| 5,478,201 A * | 12/1995 | Amr ............................ 415/206 |
| 5,511,281 A | 4/1996 | Webster |
| 5,586,359 A | 12/1996 | Iida |
| 5,588,178 A | 12/1996 | Liu |
| 5,692,262 A | 12/1997 | Haupt et al. |
| 5,791,568 A | 8/1998 | Keim |
| 5,794,864 A | 8/1998 | Hammett et al. |
| 2002/0159881 A1 * | 10/2002 | Marshall et al. ............. 416/203 |

* cited by examiner

IMPELLER FOR USE WITH PORTABLE BLOWER/VACUUMS

RELATED APPLICATION

This application, a Continuation-in-Part application, claims the benefit of priority pursuant to 35 U.S.C. §120 of pending U.S. patent application Ser. No. 09/779,966 filed Feb. 9, 2001, now U.S. Pat. No. 6,442,790.

TECHNICAL FIELD

The present invention relates to the field of impeller fans, such as for use in association with hand-held, portable blower/vacuums. More particularly, the present invention pertains to impellers having non-uniform spacing between adjacent air generating vanes.

BACKGROUND

Convertible blower/vacuum units (blower/vacs) are commonly used by homeowners and professionals alike for the removal of debris from yards, driveways, sidewalks, etc. As used herein, a convertible blower/vac is a portable device which can be configured for use as either a debris blower or a debris vacuum. When used as a vacuum, vacuum attachments coupled to the blower housing permit leaves or similar debris to be vacuumed into an attached bag or other debris container.

When used in the blower configuration, blower/vacs provide a sweeping action created by the production of a fast moving stream of air generated by a rotating impeller located within the blower housing. The impeller draws air into the housing through an air inlet opening and exhausts an accelerated air stream through a housing outlet. The air stream is typically channeled through a tapered, removable blower tube. In addition to providing a more precisely focused air stream, the tapered blower tube also yields an air stream of generally higher velocity.

Because most all blower/vac units are designed for hand-held use, they are often made of lightweight materials and utilize lightweight power sources, e.g., small electric- (battery and corded) and gasoline-powered motors. While applicable to blower/vacs having most any power source, the present invention is particularly advantageous for use with corded electric blower/vacs and the remainder of this discussion will focus on the same.

Although size and weight are criteria to consider in selection of the blower/vac motor, available power is also a factor. Generally speaking, maximum electric current draw for these and other portable consumer devices may be restricted to ensure conformance with conventional household circuits and available electrical equipment (e.g., extension cords). For example, a typical blower/vac may be designed to operate, within acceptable margins, with a 120 volt, 15 amp circuit.

Nonetheless, a blower/vac motor designed to draw a particular current load under normal operating conditions, e.g., when operating in blower mode with the blower tube installed, may, under certain circumstances, exceed that load. For example, removal of the blower tube may reduce back pressure in and around the impeller, permitting the motor to spin faster and thus draw slightly more current.

One solution that addresses this "tube removed" condition is to provide a motor that will produce maximum power, e.g., draw maximum current, when the blower tube is removed. However, such a motor will undesirably draw less current, e.g., spin at a lower speed, when the blower tube is installed. Another solution is to provide a motor that is optimized for blower operation, e.g., operation with the blower tube installed. However, as mentioned above, motors optimized for maximum current draw during blower operation may exceed the maximum desired current load if the blower tube is removed.

While either option is acceptable, a solution that yields the desired current draw, i.e., produces the maximum desired motor speed, with the blower tube installed while preventing excessive current draw when the blower tube is removed would be advantageous.

Known impeller fans, such as for use with a portable blower/vac device, have included a plurality of air flow generating vanes disposed on a base in substantially uniform manner, e.g., the vanes are equally spaced upon the impeller base. Also known are impeller fans having air flow generating vanes which provide serrations or debris-engaging structure for further mulching debris prior to deposit in a vacuum bag.

SUMMARY OF THE INVENTION

A blower/vac is provided that, generally speaking, prevents motor operation unless at least the blower tube and air inlet cover are installed. Accordingly, the motor size may be maximized for blower/vac operation without concern for excessive current draw should the blower tube be removed during operation.

In one embodiment, a portable blower/vac is provided which includes a housing having an air inlet opening and a housing outlet. A blower tube operable to removably couple to the housing outlet is further provided, as is an air inlet cover. The air inlet cover is operable to removably cover the air inlet opening. The air inlet cover is preferably retained relative to the air inlet opening by coupling with at least the housing and the blower tube.

In another embodiment of the present invention, a method for assembling a portable blower/vacuum is provided. In this embodiment, a blower housing is provided having an air inlet opening and a housing outlet. The method further includes coupling a blower tube to the housing outlet of the blower housing, and coupling an air inlet cover over the air inlet opening. The air inlet cover is coupled to both the blower tube and the blower housing.

In yet another embodiment of the present invention, a method for assembling and using a portable blower/vacuum is provided. The method includes providing a blower housing where the housing has an air inlet opening and a housing outlet. A blower tube is coupled to the housing outlet of the blower housing. The method also includes providing an air inlet cover; engaging a first latch member of the air inlet cover with a first latch receiver on the blower tube; and engaging a second latch member of the air inlet cover with a second latch receiver on the blower housing.

In still yet another embodiment, a portable blower/vac is provided which includes a blower housing. The blower housing itself includes a housing outlet; an air inlet opening in fluid communication with the housing outlet; and a rotatable impeller coupled to an electric motor. The impeller is operable to draw air into the housing through the air inlet opening and expel the air through the housing outlet. The blower/vac further includes a blower tube attachable to the housing outlet and an air inlet cover for attachment over the air inlet opening. The air inlet cover is securable by coupling to both the blower tube and the blower housing.

In yet another embodiment, the present invention provides an impeller fan, such as for use with a portable blower/vac device, having a plurality of air flow generating vanes disposed on a base in a non-uniform manner, e.g., the vanes are unequally spaced upon the impeller base. An improved impeller fan according to the present invention may have shortened members or elements which provide serrations or debris-engaging structure for further mulching debris prior to deposit in a vacuum bag. The shortened member may be a curved element generally resembling a lower portion of the air vanes. Additional debris-engaging structure may be provided between predetermined sets of vanes.

The above summary of the invention is not intended to describe each embodiment or every implementation of the present invention. Rather, a more complete understanding of the invention will become apparent and appreciated by reference to the following detailed description and claims in view of the accompanying drawings.

BRIEF DESCRIPTION OF THE DRAWINGS

The present invention will be further described with reference to the drawings, wherein.

DETAILED DESCRIPTION OF EXEMPLARY EMBODIMENTS

In the following detailed description of the exemplary embodiments, reference is made to the accompanying drawings which form a part hereof, and in which are shown by way of illustration specific embodiments in which the invention may be practiced. It is to be understood that other embodiments may be utilized and structural changes may be made without departing from the scope of the present invention.

Figure 1:
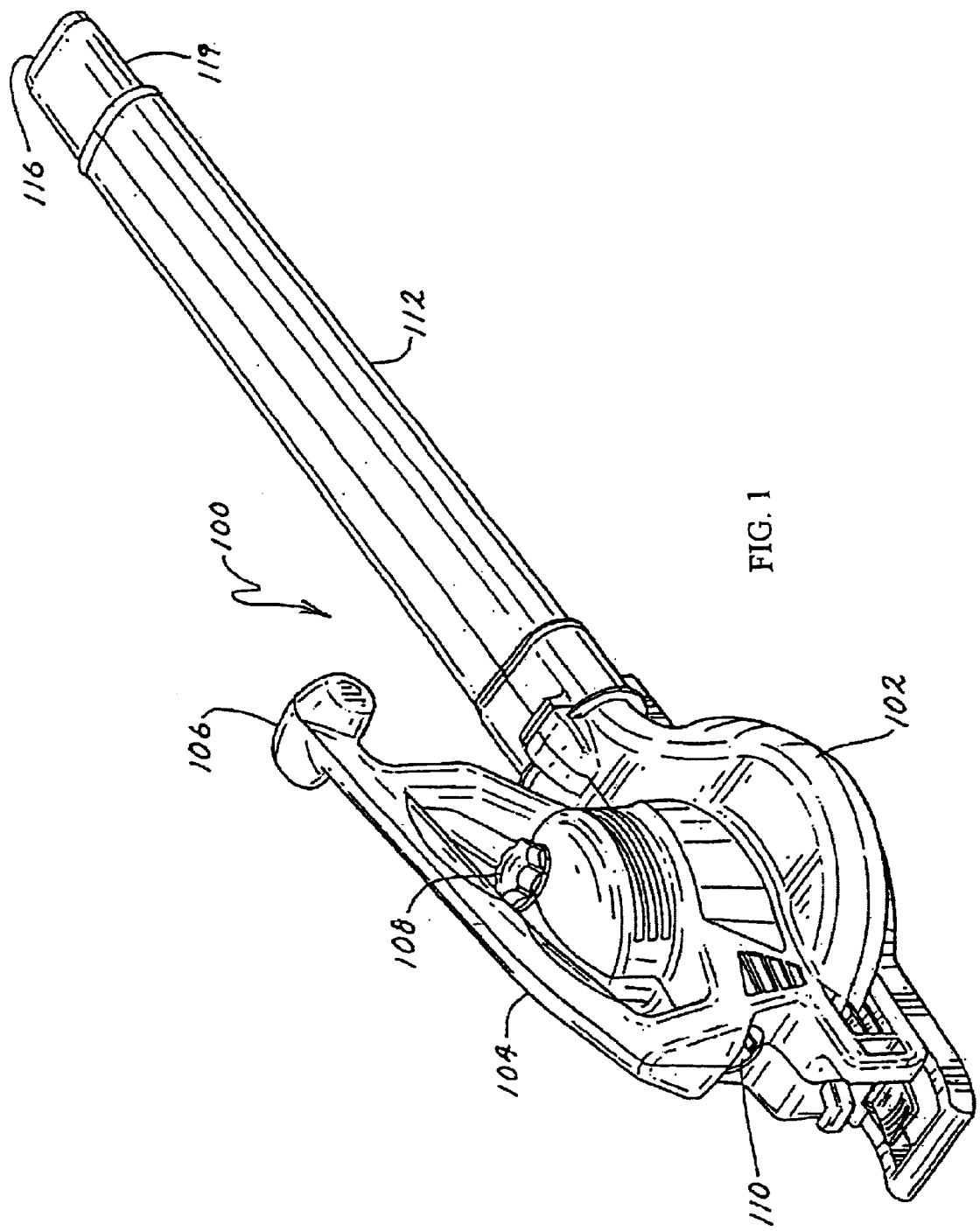
FIG. 1 is a perspective view of a blower/vacuum in accordance with one embodiment of the invention, the blower/vac shown as configured in blower mode with the blower tube and air inlet cover installed.

With reference to the drawings, wherein like reference numerals designate like parts and assemblies throughout the several views, FIG. 1 shows a perspective view of a portable, electric blower/vacuum 100 (also referred to hereinafter as "blower" or "blower/vac") in accordance with one embodiment of the invention. While the present invention is perceived to be particularly advantageous for use with corded electric blower/vacs, those skilled in the art will appreciate that it may also be used with most any type of blower/vac, e.g., gas-engine powered units. Furthermore, while described herein with application to blower/vacs, the present invention is equally applicable to units configurable as blower-only machines.

Unless otherwise noted, relative directions (e.g., upper, top, lower, bottom, etc.) are exemplary only and generally refer to the orientation of the particular part or assembly when the blower/vac 100 is in its operation position, e.g., the position generally illustrated in FIG. 1.

Figure 2:
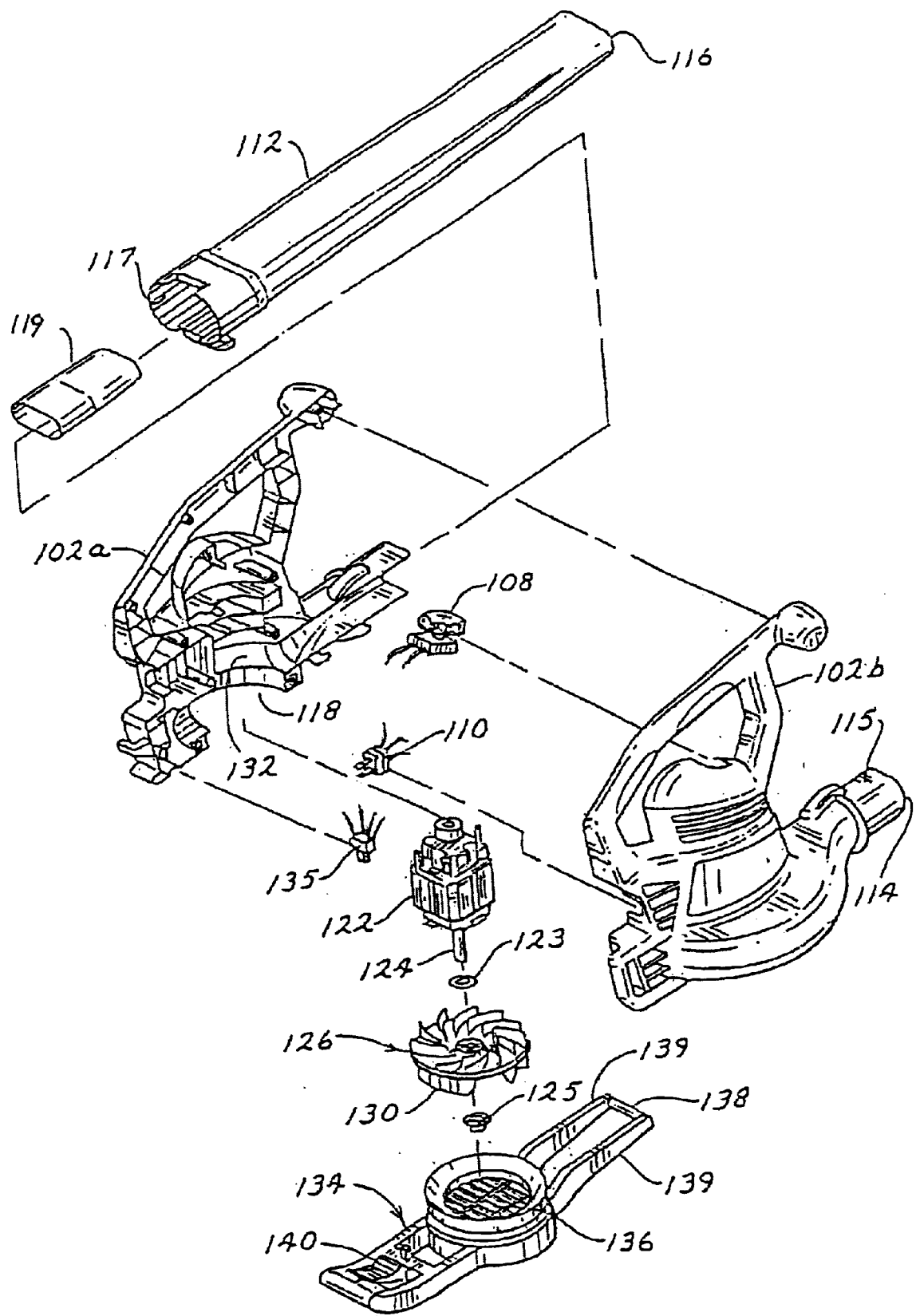
FIG. 2 is an exploded, perspective view of the blower/vac of FIG. 1.

The blower tube 112 typically tapers from the proximate end to a blower outlet 116 at a distal end. The tapered blower tube 112 is advantageous as it permits focusing of the high velocity air stream produced by the blower/vac 100. To further reduce the cross-sectional size of the blower outlet, a nozzle insert 119—as generally shown in FIGS. 1 and 2 and particularly described in commonly-assigned U.S. Pat. No. 6,003,199—may optionally be provided.

When operating in blower mode, the blower/vac 100 preferably includes a blower tube 112 as shown in FIG. 1. The blower tube 112 has a proximate end which attaches at a housing outlet 114 (see FIGS. 2 and 3). In one embodiment, the proximate end of the blower tube forms a female portion 117 which slides over a male portion 115 formed by the housing outlet 114.

The blower tube 112 typically tapers from the proximate end to a blower outlet 116 at a distal end. The tapered blower tube 112 is advantageous as it permits focusing of the high velocity air stream produced by the blower/vac 100. To further reduce the cross-sectional size of the blower outlet, a nozzle insert 118—as generally shown in FIGS. 1 and 2 and particularly described in commonly-assigned U.S. Pat. No. 6,003,199—may optionally be provided.

FIG. 2 shows the blower vac 100 of FIG. 1 in an exploded perspective view. As depicted herein, the housing 102 may preferably be formed from mating, plastic halves 102a and 102b which, when assembled, define an interior cavity. The cavity encloses a power source, e.g., an electric motor 122. The electric motor 122 is coupled to an impeller 126 via an output shaft 124 with connecting hardware, e.g., washer 123 and nut 125. When external power is provided to the motor 122, the output shaft 124, and thus the impeller 126, rotate. As the impeller 126 rotates, curved blades 154 (see FIG. 3) integrally formed with or otherwise attached to the impeller draw air into a plenum 132 formed within the housing 102. In general, air is drawn into the housing 102 through an air inlet opening 118 (see FIG. 3) where it is then accelerated and exhausted through the housing outlet 114 and blower tube 112. In some embodiments, the air inlet opening 118 resides within a first plane on a lower side of the housing 102 while the housing outlet 114 lies in a second plane that may be substantially perpendicular to the first plane.

Figure 3:
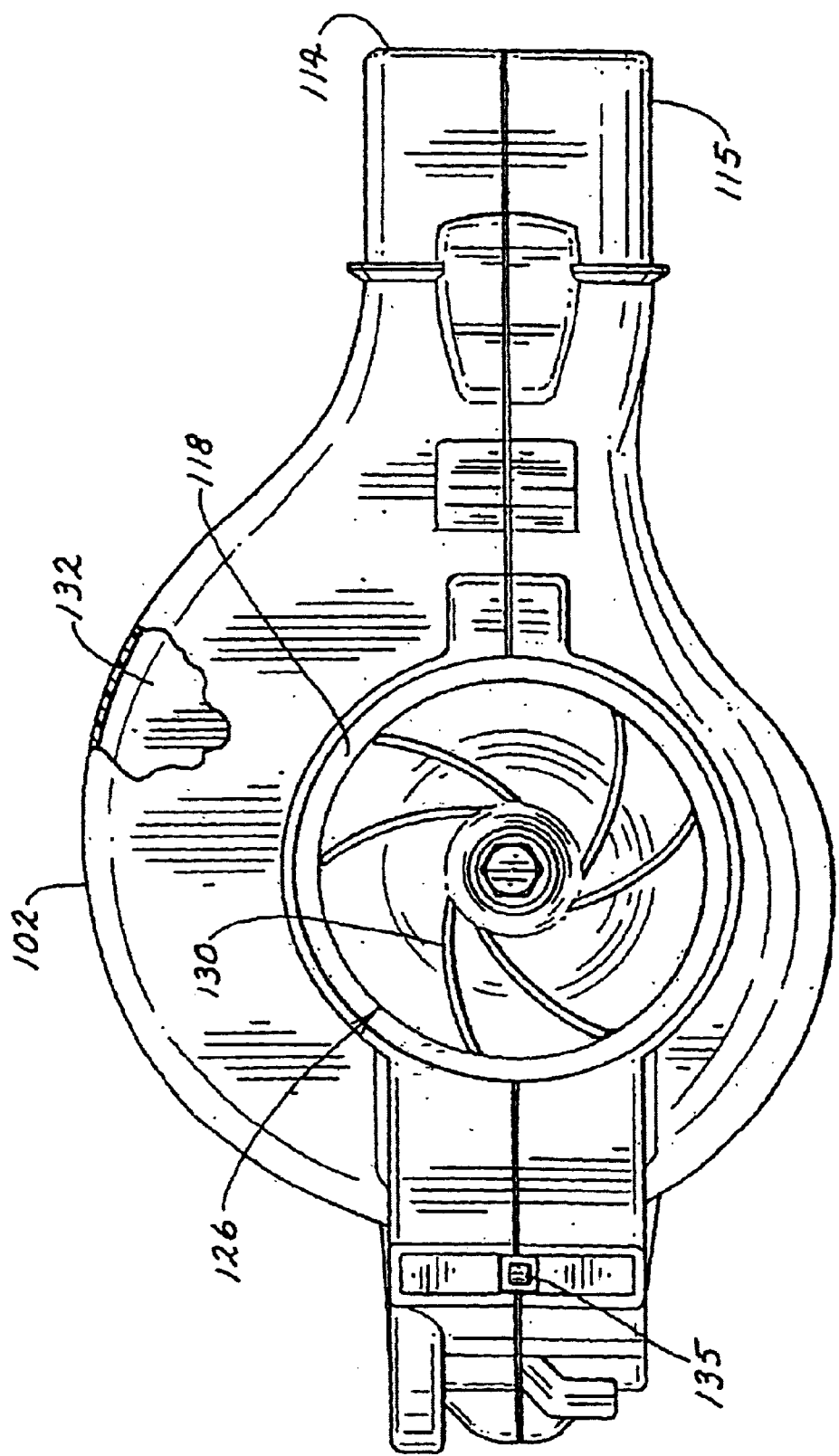
FIG. 3 is a bottom plan view of the blower/vac of FIG. 1 shown with the blower tube and air inlet cover removed.

FIG. 2 further illustrates an air inlet cover 134 in accordance with one embodiment of the present invention. A purpose of the air inlet cover 134 is to permit air to pass through the air inlet opening 118 (see FIG. 3) and into the housing 102 while, at the same time, restricting the entry of foreign objects, e.g., debris, fingers. Accordingly, the air inlet cover 134 may include a grate or grill portion 136 which covers the air inlet opening 118 when the air inlet cover 134 is installed (see FIG. 4). An interlock switch 135, explained in more detail below, may also be associated with the housing 102 as shown in FIGS. 2 and 3. The interlock switch 135, which may, for example, be wired in series with the motor 122, prevents operation of the motor unless the air inlet cover 134 is properly installed.

Figure 4:
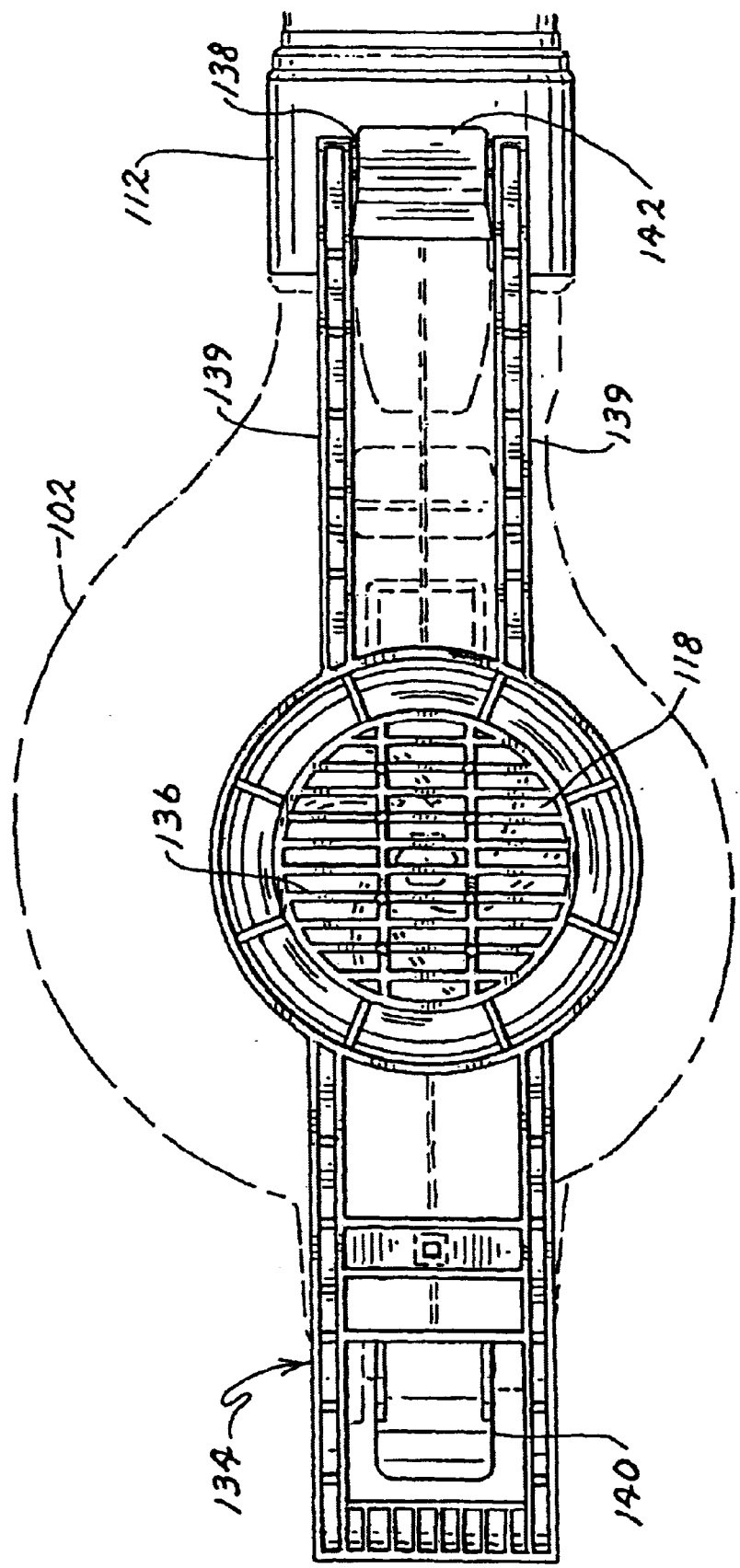
FIG. 4 is a bottom plan view of the blower/vac of FIG. 1 shown with the blower tube and air inlet cover installed.

Having described the blower/vac 100 generally, attention is now directed to an exemplary air inlet cover 134 as illustrated primarily in FIGS. 4-7. As previously stated, the air inlet cover 134 couples to the housing 102 such that the air grate 136 covers the air inlet opening 118 as shown in FIG. 4. In addition to the air grate 136, the air inlet cover 134 further includes a first latch member 138 and a second latch member 140 which are shown in more detail in FIG. 5. In one embodiment, the first latch member 138 is coupled to the air grate 136 by a pair of generally parallel rails 139 (see FIG. 4). The first latch member 138 is preferably received by a first latch receiver 142 formed on or otherwise attached to the blower tube 112. The second latch member 140 is likewise preferably received by a second latch receiver 144 formed on or otherwise attached to the housing 102 (see FIG. 5).

The geometry of the air inlet cover 134 and the first and second latch members 138 and 140 is such that engagement of both the first and second latch members 138 and 140 with the first and second latch receivers 142 and 144, respectively, secures the air inlet cover 134 to the housing 102. Preferably, the second latch member 140 and the second latch receiver 144 are unable to secure the air inlet cover 134 unless the first latch member 138 is engaged with the first latch receiver 142 as described below.

The terms latch "member" and latch "receiver" are used herein merely to simplify the description of the illustrated embodiments. Broadly speaking, the terms may include most any interconnecting structures. For instance, other embodiments of the present invention may reverse the location of the latch members and latch receivers, e.g., the first latch member 138 may be located on the blower tube 112 while the first latch receiver 142 may be located on the air inlet cover 134.

Figure 5:
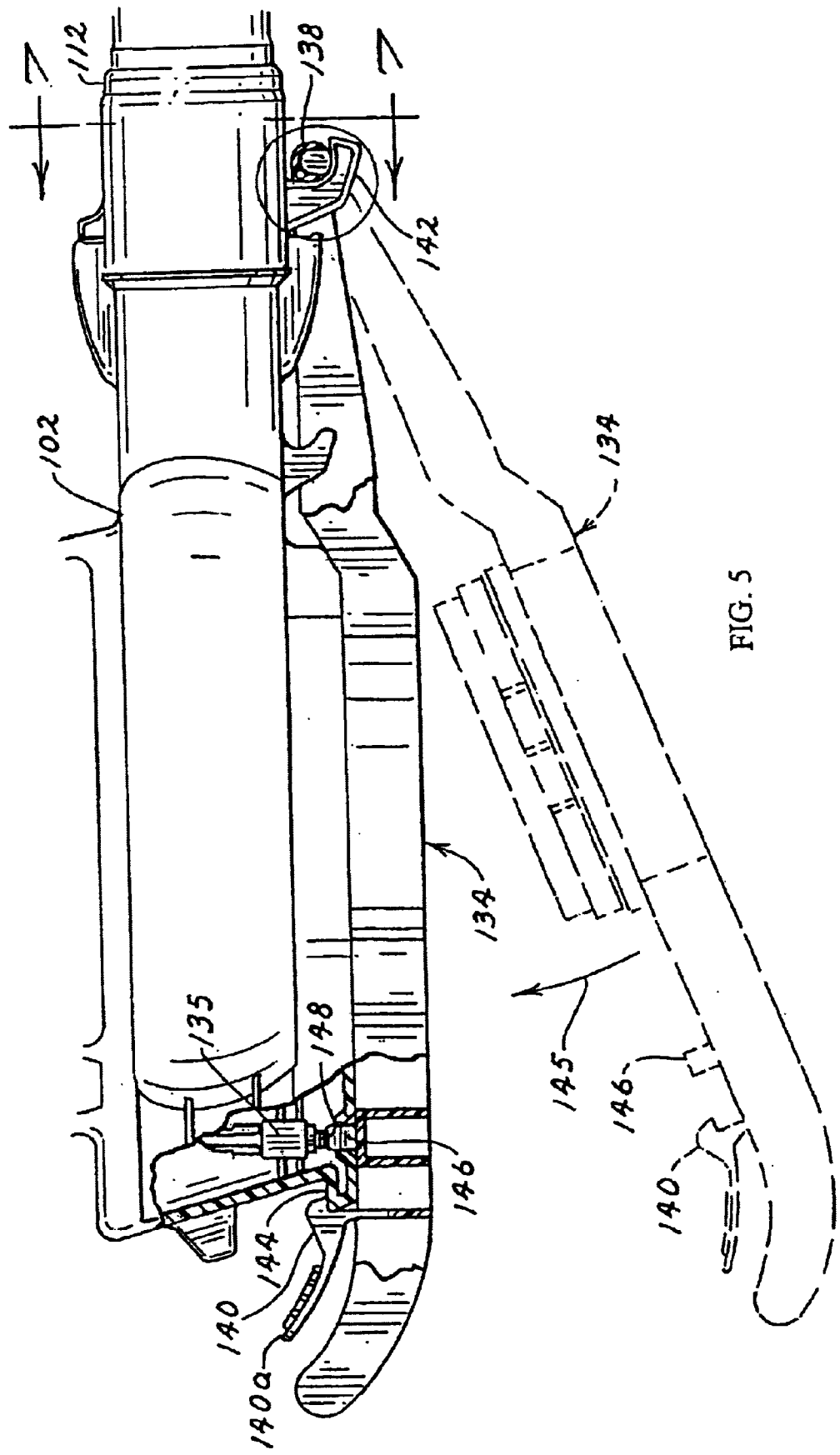
FIG. 5 is a side elevation view of the blower/vac of FIG. 1 illustrating attachment of the air inlet cover in accordance with one embodiment of the invention.
Figure 6:
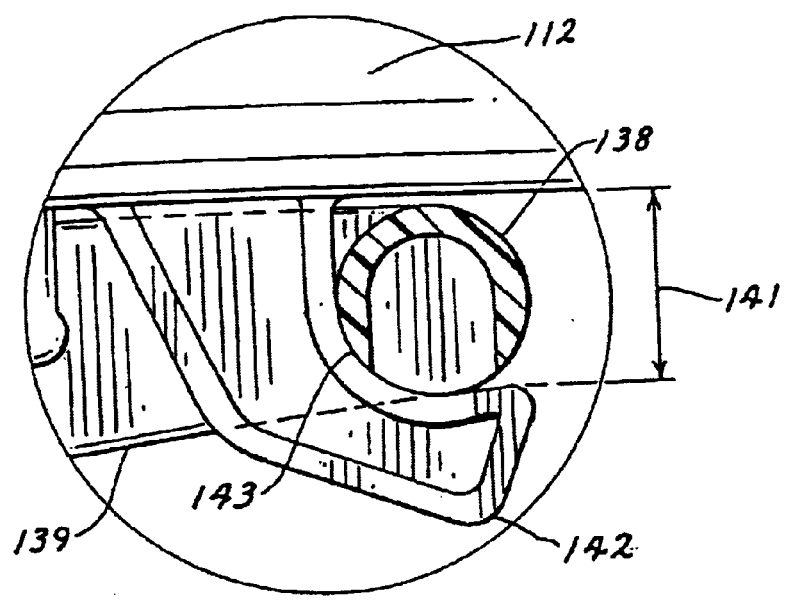
FIG. 6 is an enlarged view of a portion of the blower/vac of FIG. 5.

FIG. 6 is a partial, enlarged view of the first latch member 138 and the first latch receiver 142 illustrated in FIG. 5. As clearly illustrated, the first latch member 138 may form a tubular or cylindrically-shaped element, e.g., a pin, spanning between the rails 139 (see, e.g., FIG. 2). The first latch receiver 142, on the other hand, may form a J-shaped element, e.g., a hinge, adapted to receive the cylindrically-shaped first latch member 138. Optionally, the first latch receiver 142 is formed of a flexible material, e.g., plastic, that deforms to allow entry of the first latch member 138. Once in place, the first latch receiver 142 returns to its original shape, retaining the first latch member 138 in place, i.e., the first latch receiver 142 may couple with the first latch member 138 with a minimal "snap-fit." To thereafter detach the air inlet cover 134 from the blower tube 112, a minimal separating force may be applied by the operator to overcome the snap fit. The term "snap fit," as used herein, describes the joining of one resilient flexible member with another flexible or rigid member. The flexible member may deflect initially upon contact with the other member but ultimately returns or "snaps back" to its undeflected, or to a partially deflected, position, thereby securing one member with respect to the other. In one embodiment, the first latch receiver 142 deflects a distance 141 (see FIG. 6) of about 0.060 inches as the first latch member 138 is coupled therewith.

Once the first latch member 138 is retained within the first latch receiver 142, the air inlet cover 134 is coupled to the blower tube 112 in a hinged relationship, e.g., the air inlet cover 134 may pivot within the first latch receiver 142 as indicated in FIG. 5. The second latch member 140 may then be rotated towards the second latch receiver 144 (as indicated by arrow 145 in FIG. 5) and latched thereto. The second latch member 140 preferably forms a flexible tab integrally formed with or otherwise attached to a rearward portion of the air inlet cover 134. The second latch member 140 may deflect as it moves past the second latch receiver 144 which, in one embodiment, forms a substantially rigid lap. The second latch member 140 ultimately engages the second latch receiver 144 with a snap fit. Once the second latch member 140 and second latch receiver 144 are so coupled, the air inlet cover 134 and the blower tube 112 are secured to the blower housing 102.

As the air inlet cover 134 is pivoted in the direction 145 as indicated in FIG. 5, a protrusion 146 located on the air inlet cover engages a button 148 located on the interlock switch 135. When the air inlet cover is completely installed, e.g., the second latch member 140 latches with the second latch receiver 144, the button 148 is sufficiently depressed to engage and close the interlock switch 135, permitting operation of the electric motor 122. When the second latch member 140 is decoupled from the second latch receiver 144, the button 148, which is preferably biased outwardly, returns the switch 135 to its normally open position, preventing operation of the electric motor. In some embodiments, the second latch member 140 may include a flexible tab 140*a* (see FIG. 5) to assist the operator in decoupling the second latch member 140 from the second latch receiver 144 after use.

Figure 7:
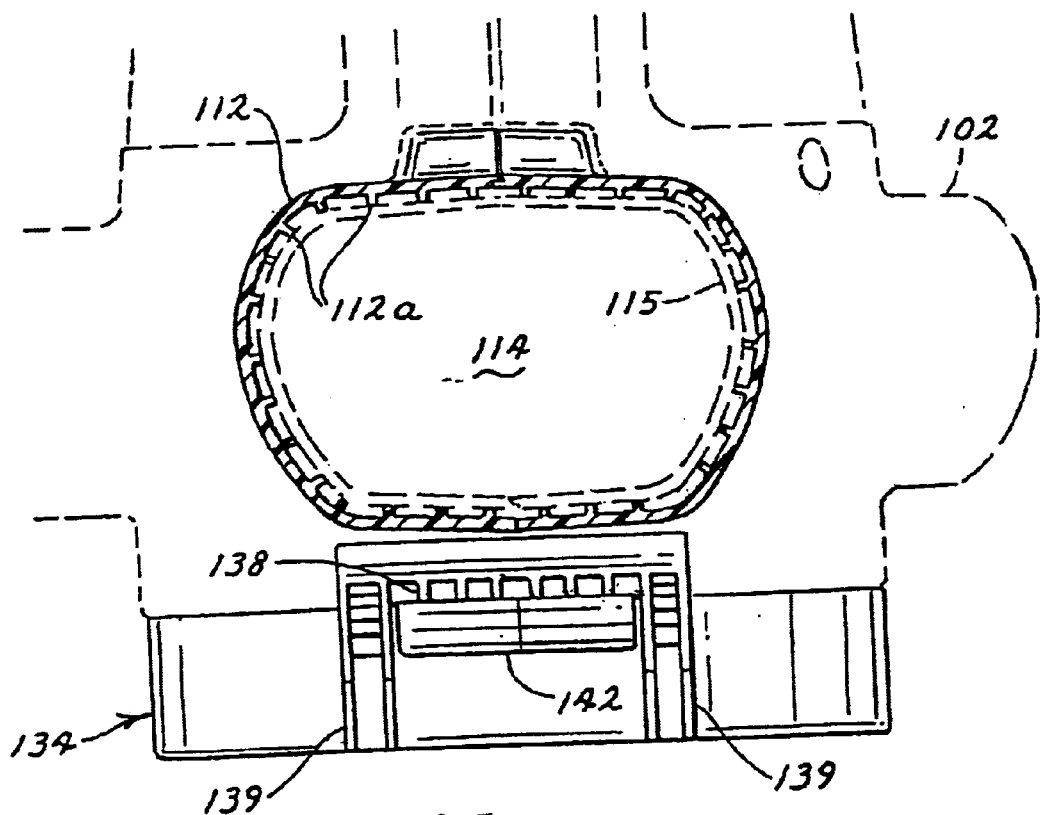
FIG. 7 is a section view taken along lines 7—7 of FIG. 5.

To operate the blower/vac 100 in blower mode, the blower tube 112 may first be coupled to the outlet 114 of the blower housing 102. In one embodiment, the female portion 117 (see FIG. 2) of the proximate end of the blower tube 112 slides over the male portion 115 (see FIG. 3) of the blower outlet 114. A cross-sectional view taken along lines 7—7 of FIG. 5 is shown in FIG. 7. As illustrated herein, the blower tube 112 may include small structural ribs 112*a* that provide increased rigidity to the blower tube and may further assist with its attachment. Preferably, the shape of the blower tube 112 and outlet 114 prevent coupling of the blower tube 112 in any but the desired orientation, e.g., with the first latch receiver 142 extending downwardly. Once the blower tube 112 is in place, the first latch member 138 may then be coupled to the first latch receiver 142. Thereafter, the air inlet cover 134 may be rotated in the direction 145 (see FIG. 5) about the first latch member 138 until the second latch member 140 engages the second latch receiver 144 with a snap fit. As the second latch member 140 and second latch receiver 144 are engaged, the protrusion 146 engages the interlock switch 135, permitting operation of the motor 122.

Engagement of only the second latch member 140 with the second latch receiver 144 alone preferably is incapable of retaining the air inlet cover 134 to the blower housing 102. As a result, the air inlet cover 134 cannot be coupled to the housing 102, nor can the interlock switch 135 be correctly engaged, without first coupling the first latch member 138 with the first latch receiver 142. Stated another way, the blower/vac 100 generally cannot operate unless both the blower tube 112 and the air inlet cover 134 are installed as described herein. As a result, blower/vacs 100 of the present invention may utilize motors sized for maximum current draw with the blower tube installed without concern for potential current overdraw when the blower tube is removed. Other advantages may also be realized. For example, attachment of the separate air inlet cover 134 and blower tube 112 may be detected with the use of a single interlock sensor, e.g., switch 135.

Although not depicted, one or more additional mechanisms for securing the blower tube 112 to the blower housing 102 may also be provided, such that the blower tube 112 may be secured in the absence of the air inlet cover 134.

Still other embodiments are possible without departing from the scope of the invention. For example, as mentioned above, the first latch member, e.g., a cylindrically-shaped member, may be located on the blower tube 112 while the first latch receiver, e.g., a J-shaped element, may be located on the air inlet cover 134. Moreover, the first and second latch members and latch receivers may be configured to couple in alternative manners. For example, instead of pivoting about a transverse axis (the axis of the first latch member 138 as shown in FIG. 5) as described and illustrated, the first latch member 138 and first latch receiver 142 may be configured to permit pivoting of the air inlet cover 134 about most any axis, e.g., about an axis generally parallel to the impeller 126. The second latch member 140 and second latch receiver 144 may be reconfigured to accommodate such alternative latching configurations without departing from the scope of the invention. In still other embodiments, the air inlet cover 134 may be coupled via translational displacement instead of by pivotal movement as described herein. For instance, after coupling the first latch member 138 and first latch receiver 142, the air inlet cover 134 may be displaced, e.g., pulled, rearwardly, preferably against a forwardly-biasing force, to engage the second latch member 140 with the second latch receiver 144.

Figure 8:
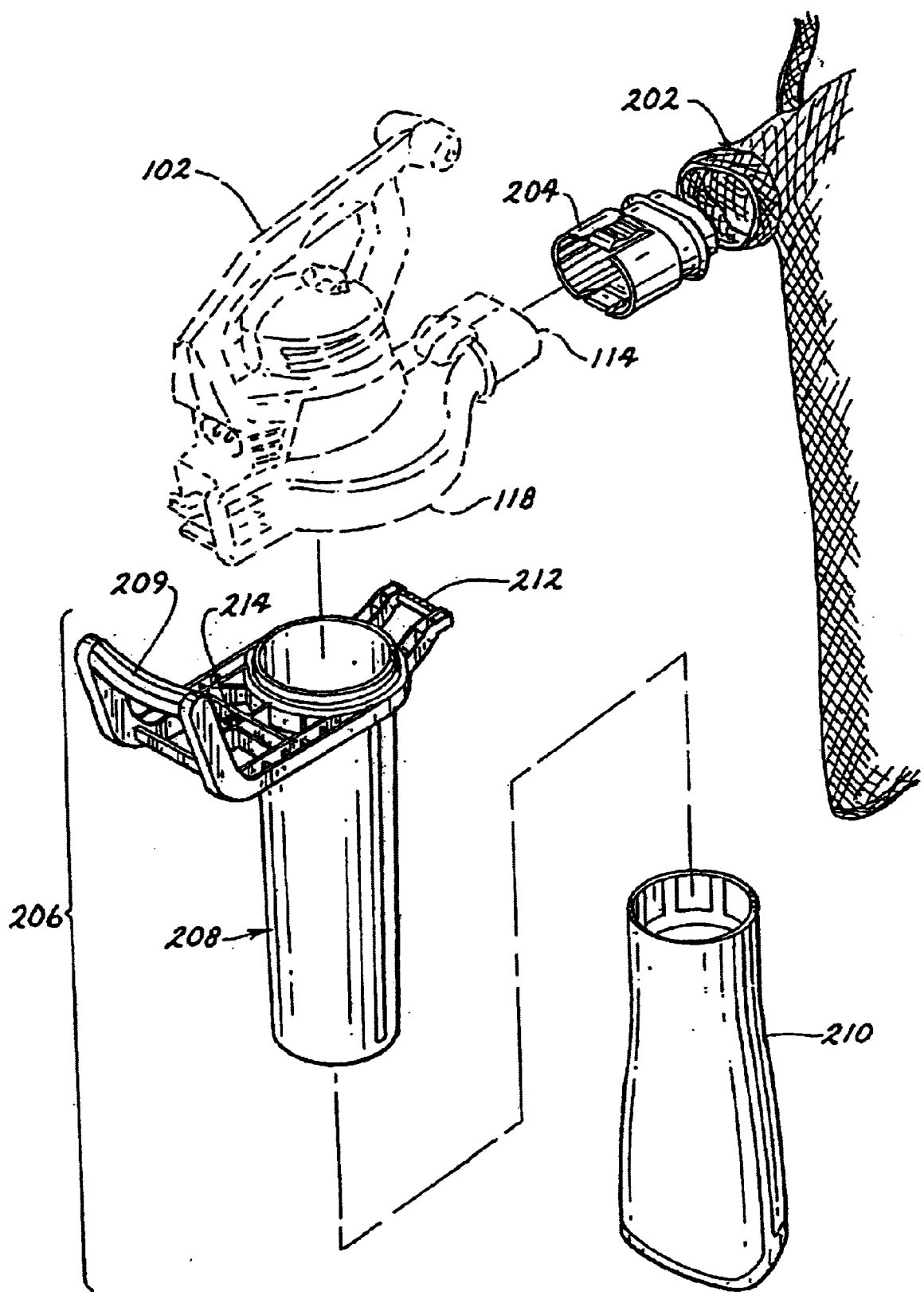
FIG. 8 is an exploded, perspective view of the blower/vac of FIG. 1 as configured for operation in vacuum mode in accordance with one embodiment of the invention.
Figure 9:
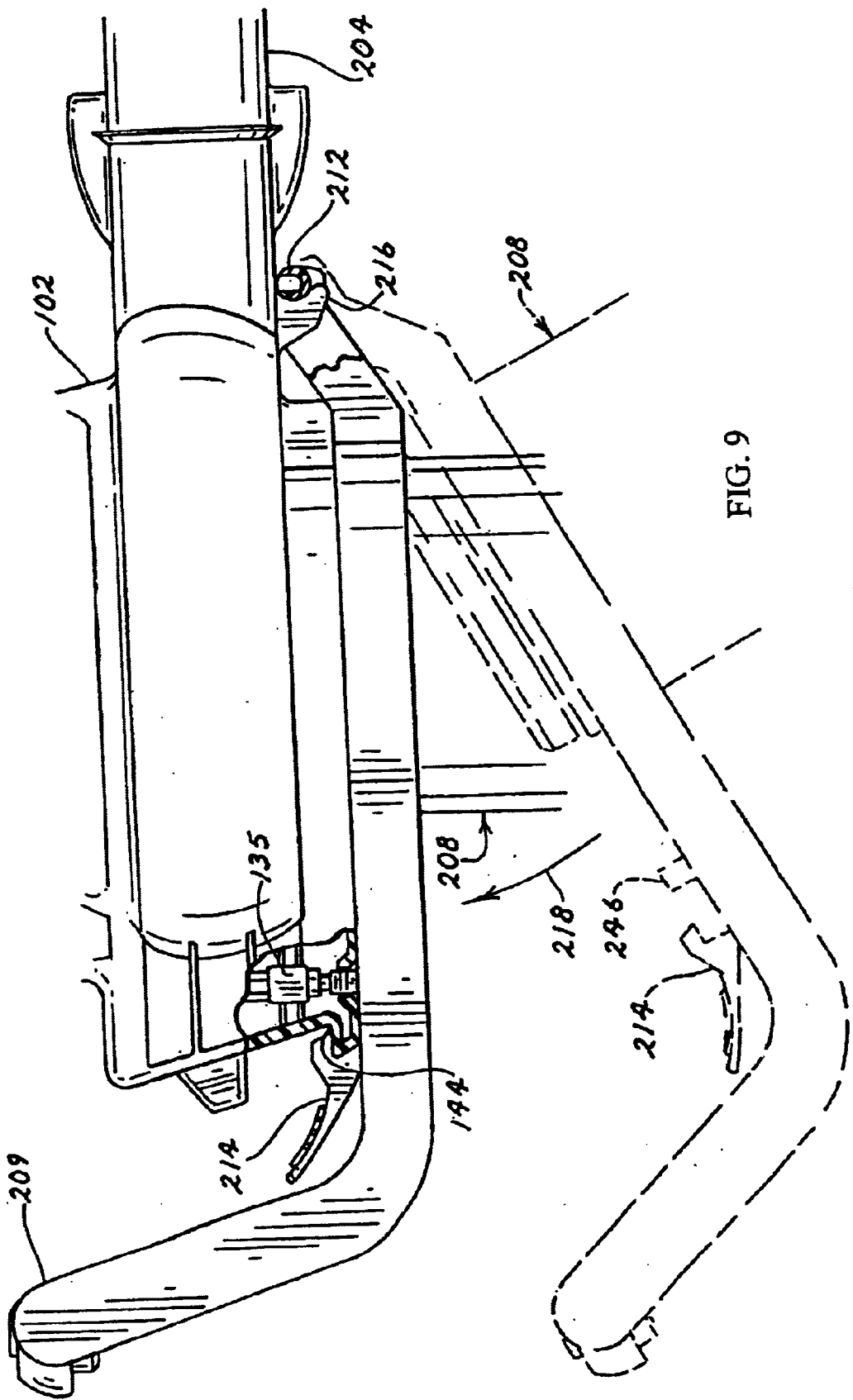
FIG. 9 is a side elevation view of the blower/vac of FIG. 8 illustrating the attachment of the vacuum tube.

FIGS. 8 and 9 illustrate a blower/vac of the present invention as configured for use as a vacuum. In particular, FIG. 8 illustrates a vacuum tube assembly 206 adapted to couple to the housing 102 at the air inlet opening 118. The vacuum tube assembly 206 may include an upper tube 208 and a lower tube 210. The lower tube 210 may flare to provide more effective vacuum operation. The upper tube 208 preferably includes a first latch member 212, similar in most respects to the first latch member 138 (see FIGS. 5 and 6), and a second latch member 214, similar in most respects to the second latch member 140 (see FIG. 5). To collect vacuumed debris, a vacuum collection bag 202 is coupled to the housing outlet 114 via a vacuum bag collar 204. During operation, the impeller 126 draws air and entrained debris through the tube assembly 206. In the vacuum configuration, the impeller 126 may, in addition to generating vacuum air flow, mulch or shred the debris before expelling it out of the housing outlet 114 and into the vacuum collection bag 202.

FIG. 9 is a side view of the housing 102 and upper tube 208 of FIG. 8. As stated above, the upper tube 208 preferably includes coupling features, e.g., first and second latch members 212 and 214, for attaching the tube assembly 206 to the housing 102. The first latch member 212 couples with a first latch receiver 216 which is similar in most respects to the first latch receiver 142 (see FIG. 5) except that it is integrally formed or otherwise attached to the housing 102 instead of the blower tube 112. Alternatively, the first latch receiver 142 may also be coupled to the bag collar 204. Once the first latch member 212 is coupled to the first latch receiver 216, the upper tube 208 may pivot in the direction 218 until the second latch member 214 engages the second latch receiver 144 of the housing 102. A protrusion 246 engages the interlock switch 135 in a manner similar to that discussed with respect to protrusion 146. Accordingly, the upper tube 208 attaches to the housing 102 in a manner similar to that of the air inlet cover 134 described above. When installed, the upper tube 208 may provide a secondary handle 209 which allows more comfortable operation for vacuum operations.

Referring now to FIGS. 10–14, two preferred embodiments of an impeller 126 according to the present invention are illustrated. Impeller 126 is a centrifugal fan including a central hub 150, a circular base 152, a plurality of air flow generating vanes 154 disposed on the base 152, and a plurality of shortened members 156 disposed upon the base 152 and positioned between adjacent groupings of vanes 154. Hub 150 is used to mount impeller 126 on drive shaft 124. A plurality of air flow generating vanes 155 are disposed on the reverse side of the base 152 and utilized to create a motor cooling air flow.

Figure 10:
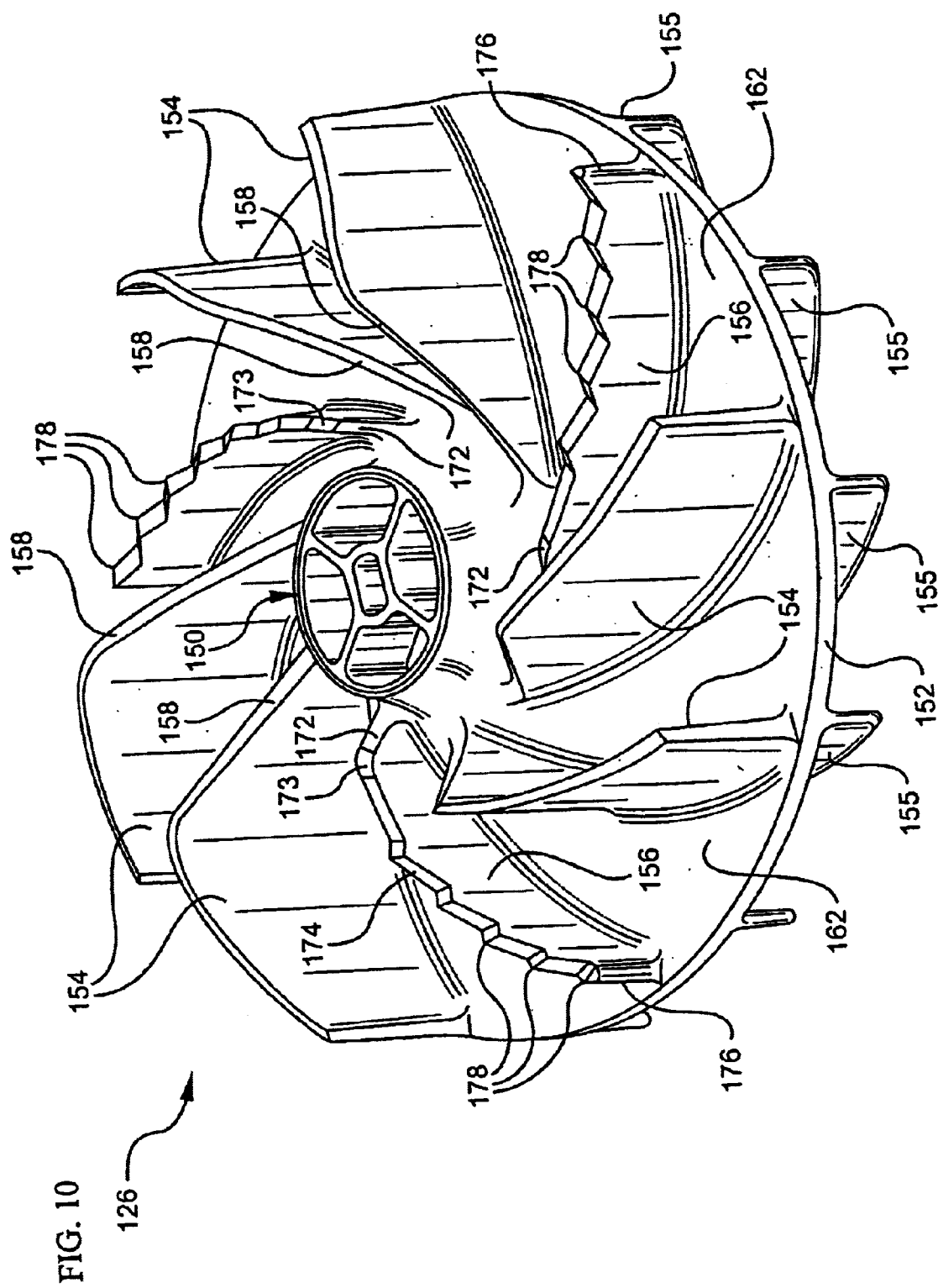
FIG. 10 is a perspective view of an impeller in accordance with one embodiment of the invention.
Figure 11:
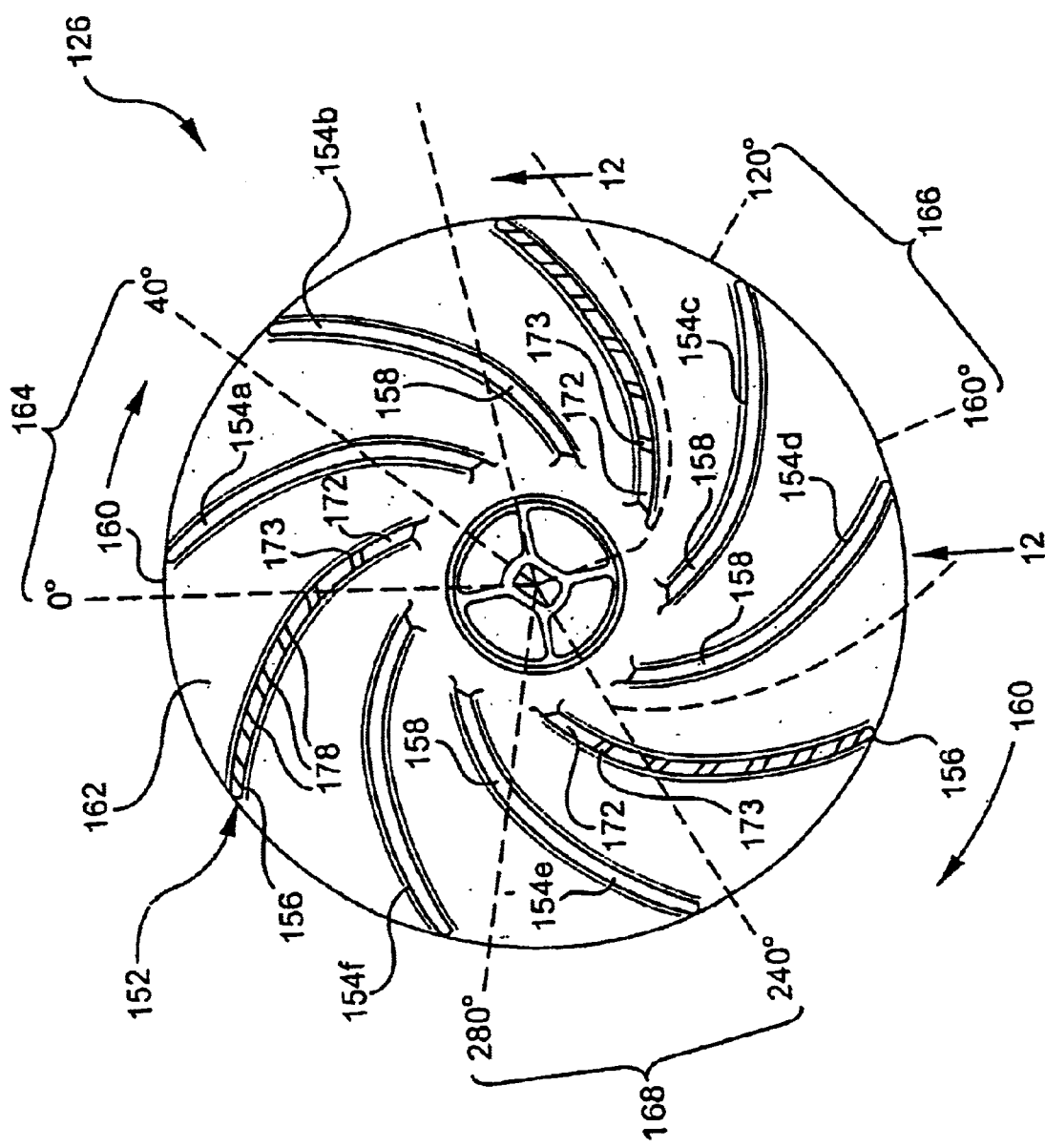
FIG. 11 is a top plan view of the impeller of FIG. 10 illustrating the non-uniform placement of the air flow generating vanes.
Figure 12:
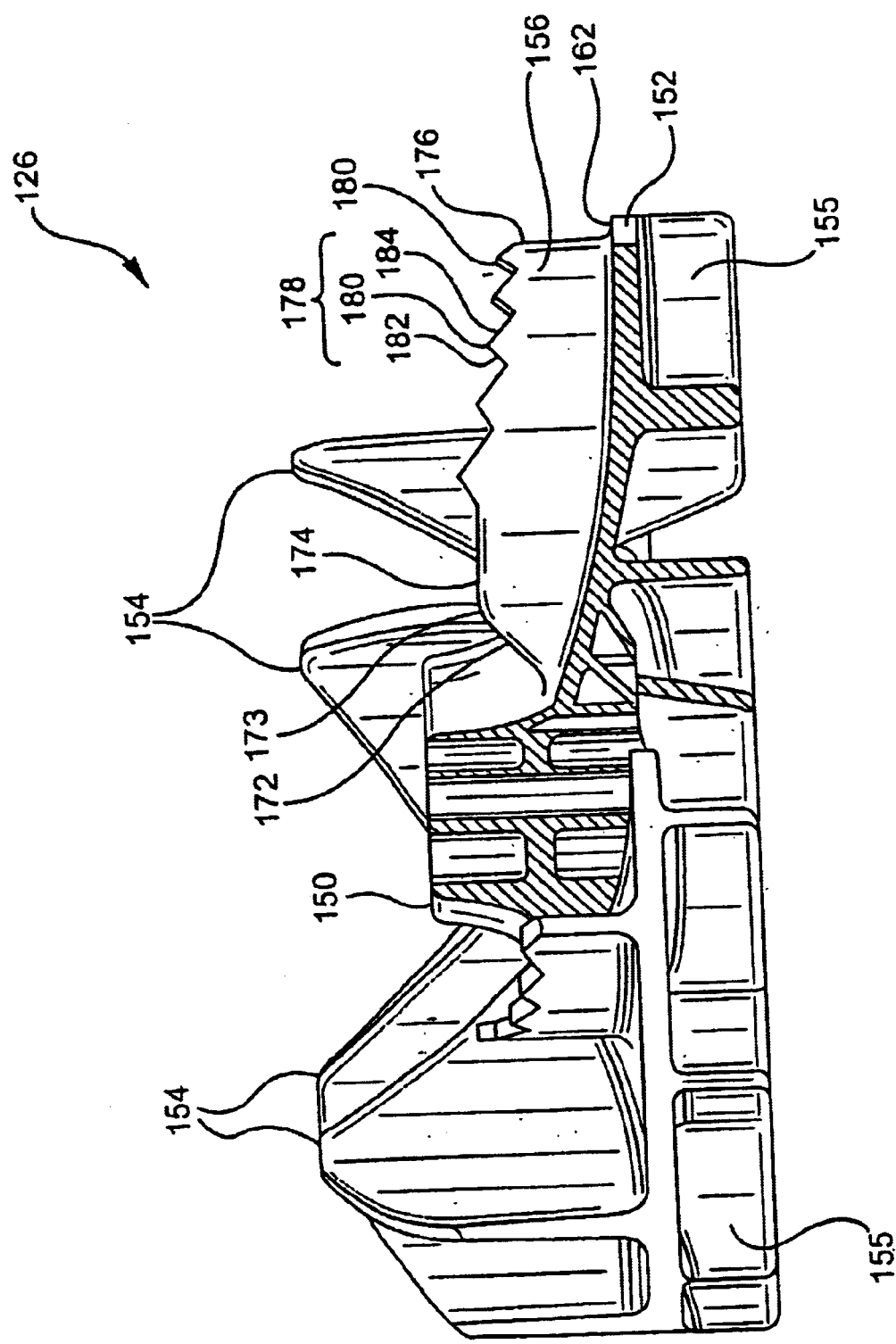
FIG. 12 is a cross sectional elevational view of the impeller of FIG. 11, taken along section 12—12.

Referring particularly to FIGS. 10–12, a first embodiment of an impeller 126 according to the present invention is illustrated. Impeller 126 has an intended direction of rotation indicated by arrows 160. Six backwardly-curved air flow generating vanes 154 are defined upon a curved upper surface 162 of base 152. The vanes 154 are approximately identical in height and are generally radially disposed relative to the central hub structure 150. Each of these vanes 154 has an inside leading edge 158 adjacent the central hub 150. Each leading edge 158 is smooth and includes no sharply defined serrations or points. The vanes 154 are disposed upon the base 152 in three spaced groups of two vanes 164, 166, 168. As illustrated in FIG. 11, each vane 154 is somewhat backwardly curved away from the direction of rotation 160. Referring still to FIG. 11, each of the three groups of vanes 164, 166, 168 are substantially symmetrically disposed upon the base 152 relative to the central hub 150, e.g., the three groups of vanes 164, 166, 168 are disposed at angular intervals of approximately 120 degrees relative to the hub 150. With regard to each vane 154 an angular disposition may be associated relative to the central hub 150. Referring still to FIG. 11, the angular position of the vanes 154a–f may be characterized by radial lines draw from the center of the central hub 150 to the trailing edge of each vane 154. In this regard, vane 154a may be characterized as a datum or reference vane at a zero (0) degree position, vane 154b is at the 40 degree position, vane 154c is at the 120 degree position, vane 154d is at the 160 degree position, etc. An angular offset may be defined as the difference between the angular positions of adjacent vanes, e.g. vanes 154a and 154b have an associated angular interval of 40 degrees, while vanes 154b and 154c have an associated angular interval of 80 degrees.

Referring particularly to FIGS. 10–12, in between each of the groups of vanes 164, 166, 168 is a shortened member 156. In this embodiment, the shortened member 156 is backwardly curved in a similar manner to vanes 154. As later described herein, the shortened members 156 function as debris-engaging elements during operation of the blower/vac in a vacuum configuration. In this illustrated embodiment, three such curved members 156 are present. Each curved member 156 has a smooth inside leading edge 172, a configured top edge 174, and a trailing edge 176. The inside leading edge 172 is adjacent the central hub 150 and smoothly transitions without sharply defined points or serrations from the surface 162 of the base 150 through a radius portion 173 to the top edge 174. A plurality of serrations 178 are provided along a portion of the top edge 174 of each shortened curved member 170. In comparison, and with reference to FIG. 3, another embodiment of the impeller 126 would lack any debris engaging shortened members 156 between the adjacent vanes 154.

FIG. 12 is a cross-sectional elevational view of the impeller 126 of FIG. 11, taken along section lines 12—12. As illustrated in FIG. 12, each serration 178 includes a point 180 defined by an inwardly facing (toward the hub 150) portion 182, and an outwardly facing portion 184. As illustrated in FIG. 12, the height of the points 180 relative the upper surface 162 of the base 152 is substantially equivalent.

It should be appreciated that alternative configurations for the shortened members 156 may also be practicable. In the embodiment of FIGS. 10–12, the shortened members 156 are backwardly curved in similar manner to vanes 154. In alternative embodiments, the debris engaging shortened members 156 may be disjointed segments or structures. Other embodiments of members 156 may also include different serration structures 178. Additionally, the members 156 may be an integral structure of the impeller 126, or could be secured to the impeller 126 during manufacture. The members 156 and/or impeller 126 could be manufactured of a metal, such as aluminum or magnesium, to promote operational longevity.

Referring again to FIG. 11, the angular interval between adjacent vanes 154 is not substantially uniform around the impeller 126 circumference, e.g., each vane 154 has a pair of neighboring vanes 154 which are disposed at different angular intervals relative to the impeller 126 center. Stated in other words, the distances between a vane 154 and its two adjacent vanes 154 are different, or each vane 154 is disposed upon the impeller 126 in a non-uniform manner so that each vane is physically closer to one of its two adjacent vanes than the other adjacent vane. In this particular illustrated embodiment, each of the vanes 154 has neighboring vanes 154 displaced at angular intervals of approximately 40 degrees and 80 degrees. For example, vane 154b has adjacent vanes 154a and 154c. Its adjacent vane 154a is disposed at an angular interval of 40 degrees and its adjacent vane 154c is disposed at an angular interval of 80 degrees. It should be appreciated that alternative angular intervals may also be practicable. Additionally, each of the vanes 154 of an impeller 126 may have neighboring vanes 154 which are disposed at different angular intervals.

Figure 13:
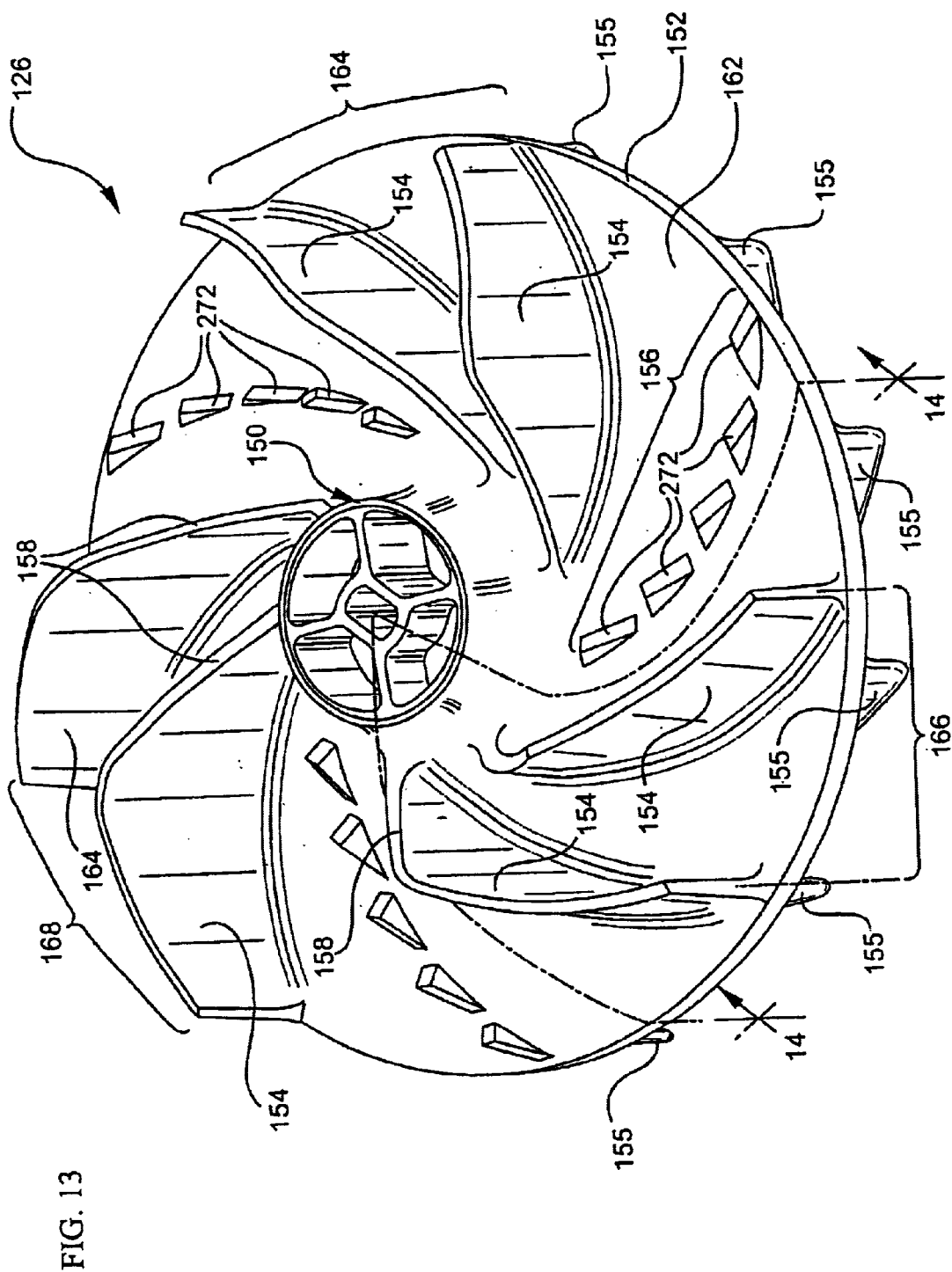
FIG. 13 is a perspective view of an impeller in accordance with another embodiment of the invention.
Figure 14:
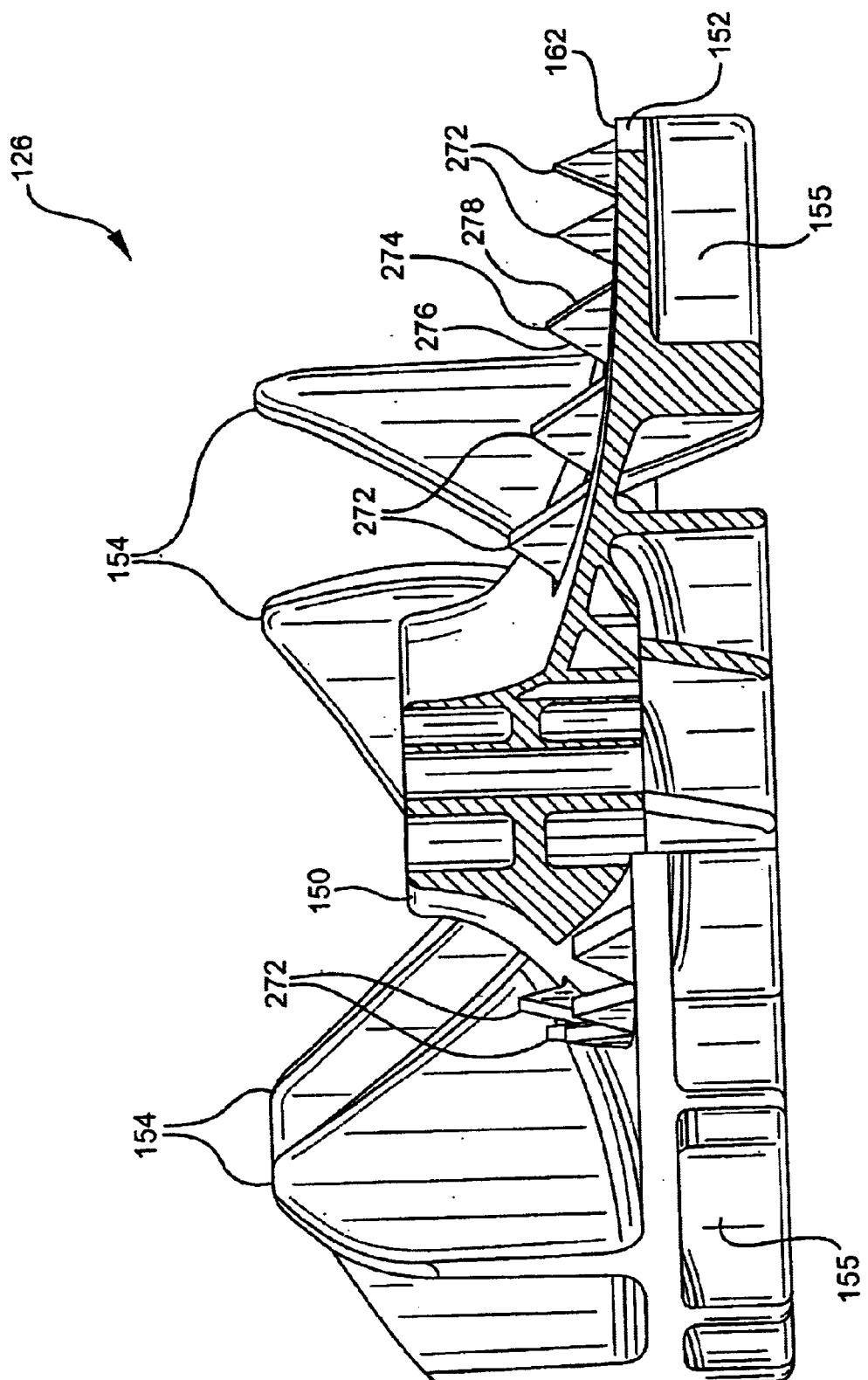
FIG. 14 is a cross sectional elevational view of the impeller of FIG. 13, taken along section 14—14.

Referring now to FIGS. 13–14, another preferred embodiment of an impeller 126 according to the present invention is disclosed. Like numerals of FIGS. 10–14 reference like elements or structure. In between each of the groups of vanes 164, 166, 168 is a shortened member 156 that generally parallels the adjacent vanes 154. In the illustrated embodiment, three shortened members 156 are present. Each of the shortened members 156 includes five upwardly extending structures 272 functioning as debris-engaging elements. In this embodiment, the debris engaging elements 272 are serrations including a point 274 defined by an inwardly facing (toward the hub 150) portion 276, and an outwardly facing portion 278. In the embodiment of FIGS. 13–14, the inwardly facing portion 276 and outwardly facing portion 278 are approximately equal in length. As illustrated in FIG. 14, the height of the debris engaging elements 272 relative to the top surface 162 of the base 152 is substantially equivalent and substantially less than the height of the vanes 154.

It should be appreciated that alternative configurations for the debris-engaging elements 272 may also be practicable. For example, the debris engaging elements 272 may include different serration structures. Additionally, while the embodiments of FIGS. 13–14 illustrate debris engaging elements 272 which are aligned along a curved shortened member between adjacent vanes 154, in other embodiments the debris engaging elements 272 may be configured in other shapes, patterns, or configurations. For example, multiple debris engaging elements 272 may be disposed between adjacent vanes 154 to create a dimpled pattern. Additionally, the debris engaging elements 272 may be an integral part of the impeller 126, or could be secured to the impeller 126 during manufacture. These and other embodiments of the debris engaging elements 272 would be appreciated by those skilled in the relevant arts and are intended to be within the scope of the appended claims.

During operation of the blower/vac in a vacuum configuration, the serrations 178 on the shorted curved members 170 or the debris engaging elements 272 provide a plurality of debris-engaging points which act to break apart lawn debris into smaller portions. As a result, the mulched lawn debris is finer and occupies less volume in the vacuum collection bag 202.

Exemplary embodiments of the present invention are described above. Those skilled in the art will recognize that many embodiments are possible within the scope of the invention. For instance, the configuration of the latch members and latch receivers could be most any design that permit coupling of the air inlet cover and blower tube as described herein. Other variations, modifications, and combinations of the various parts and assemblies can certainly be made and still fall within the scope of the invention. Thus, the invention is limited only by the following claims, and equivalents thereto.

What is claimed is:

1. An impeller for a portable blower/vac comprising:
    a hub structure for mounting the impeller on a rotatable shaft of the blower/vac;
    a base structure coupled to the hub structure;
    a plurality of air-flow generating vanes disposed upon the base structure with an irregular spacing between adjacent vanes; and
    a plurality of shortened members disposed upon the base structure.

2. The impeller of claim 1, wherein each vane is disposed in a generally radial orientation relative to the hub structure.

3. The impeller of claim 1, wherein each vane has a pair of adjacent vanes, and wherein one of the adjacent vanes is disposed at an angular interval of approximately 40 degrees and the other is disposed at an angular interval of approximately 80 degrees.

4. The impeller of claim 1, wherein each of the plurality of air-flow generating vanes are backwardly curved vanes.

5. The impeller of claim 1, wherein the vanes are provided in spaced groupings of two vanes each.

6. The impeller of claim 1, wherein each of the plurality of shortened members is disposed between a different pair of adjacent vanes.

7. The impeller of claim 1, wherein each of the plurality of shortened members is a single backwardly curved element.

8. The impeller of claim 1, wherein each shortened member includes a leading edge, and top edge, and a trailing edge.

9. The impeller of claim 1, wherein each of the plurality of shortened members includes a debris engaging serrated structure along a top edge.

10. An impeller for generating an air-flow, said impeller comprising:
    a hub structure for mounting the impeller on a rotatable shaft;
    a plurality of air flow generating vanes coupled to the hub structure, each vane having a trailing edge away from the hub structure, and wherein distances between the trailing edges of adjacent vanes are substantially non-uniform; and a plurality of shortened members coupled to the hub structure.

11. An impeller according to claim 10, further comprising:

a base structure coupled to the hub structure, wherein each of the plurality of air-flow generating vanes is disposed upon the base structure.

12. The impeller of claim 10, wherein each vane is disposed in a generally radial orientation relative to the hub structure.

13. The impeller of claim 10, wherein the plurality of vanes includes at least one backwardly curved vane.

14. The impeller of claim 13, wherein the plurality of vanes are provided in spaced groupings of two vanes each.

15. The impeller of claim 10, wherein each of the plurality of shortened members is disposed between a different pair of adjacent vanes.

16. The impeller of claim 10, wherein each of the plurality of shortened members is a single curved element.

17. The impeller of claim 10, wherein each shortened member includes a leading edge, and top edge, and a trailing edge.

18. The impeller of claim 10, wherein each of the plurality of shortened members includes a debris engaging serrated structure along a top edge.

19. A portable blower/vac having a vacuum mode of operation comprising:

a housing;

a power source coupled to the housing and having an output shaft for rotation on an axis;

an impeller coupled to the output shaft and rotatable therewith, said housing forming an air flow channel around said impeller, said impeller comprising a hub coupled to said output shaft and a plurality of vanes extending generally outwardly from said hub, said vanes provided in non-uniform spacing around the hub; and a plurality of debris engaging shortened members coupled to the hub.

20. The portable blower/vac of claim 19, wherein each of the plurality of shortened members is disposed between a different pair of adjacent vanes.

21. The portable blower/vac of claim 19, wherein each of the plurality of debris engaging shortened members is a single backwardly curved element.

22. The portable blower/vac of claim 19, wherein each of the plurality of debris engaging shortened members includes a serrated edge along a top portion.

23. A method for manufacturing an impeller for a portable blower/vacuum, comprising:

providing an impeller hub structure for mounting the impeller on a rotatable shaft of the blower/vac;

coupling a plurality of air-flow generating vanes to the hub structure in generally radial orientation about the hub structure, said vanes being disposed in non-uniform spacing around the hub structure; and coupling a plurality of debris engaging shortened members to the hub structure.

* * * * *